United States Patent [19]

Wiley

[11] 3,720,487
[45] March 13, 1973

[54] PRESSURE CONTROL
[75] Inventor: Bruce F. Wiley, Bartlesville, Okla.
[73] Assignee: Phillips Petroleum Company, Bartlesville, Okla.
[22] Filed: Nov. 4, 1971
[21] Appl. No.: 195,665

[52] U.S. Cl..................................417/572, 138/31
[51] Int. Cl.................................F16l 55/04
[58] Field of Search..........417/36, 540, 542; 138/31; 60/51

[56] References Cited

UNITED STATES PATENTS 2,453,732  11/1948  Stephens.........................60/51
2,934,025  4/1960  Wilson............................417/540 X Primary Examiner—Carlton R. Croyle
Assistant Examiner—Leonard Smith
Attorney—J. Arthur Young et al.

[57] ABSTRACT

The pressure in a closed hydraulic system is maintained constant by adjustment of the volume of a variable-volume chamber in communication with the system. This adjustment is made by a servo unit in response to measured pressure changes in the hydraulic system.

5 Claims, 3 Drawing Figures

INVENTOR.
B. F. WILEY

PRESSURE CONTROL

In various laboratory and industrial operations it is necessary to provide chambers which are maintained at elevated pressures. Hydraulic fluid is usually employed to supply the pressure, particularly when high pressures are involved. The hydraulic fluid is delivered to the chamber by a conduit system which has a hydraulic pump therein. A pressure gage is connected to the test chamber in order to measure the pressure being supplied. In one such system, a valve in the conduit is closed when the desired pressure is reached so that hydraulic fluid under this pressure is maintained in contact with the chamber. However, it has been found that many hydraulic fluids exhibit substantial changes in volume when temperature changes occur, particularly at elevated pressures. At pressures of the order of 10,000 pounds per square inch, for example, a few degree temperature change can result in an appreciable pressure change due to a change in volume of the hydraulic fluid. In normal operation, the temperature of the oil is increased when pressure is built up. The oil subsequently cools and the volume decreases. While temperature controlled baths can be employed to minimize the fluctuations, it is generally not possible to control the temperature of the entire system.

In accordance with this invention, a system is provided for changing the pressure in a closed hydraulic system automatically in response to measured pressure changes. This is accomplished by means of an adjustable volume surge chamber which is connected to the hydraulic line. The volume of the surge chamber is changed automatically in response to detected changes in pressure by means of a servo unit which is connected to a pressure gage in the hydraulic system.

In the accompanying drawing.

Figure 1:
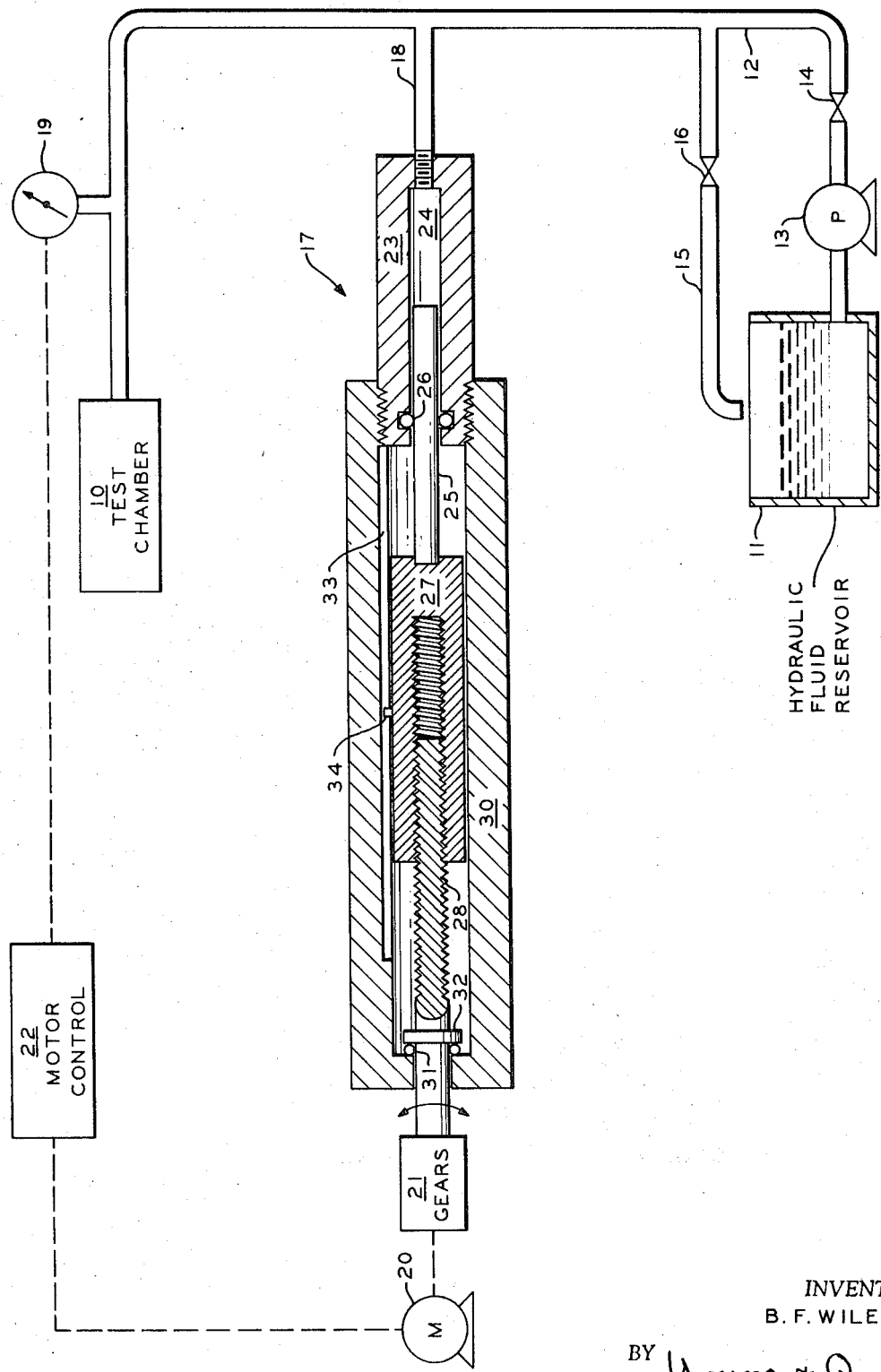
FIG. 1 is a schematic representation of an embodiment of the pressure control system of this invention.

Referring now to the drawing in detail and to FIG. 1 in particular, there is shown a test chamber 10 which is to be maintained at an elevated pressure. In one specific example of this invention, chamber 10 can comprise a housing which contains a core obtained from a well bore. The core is subjected to elevated pressures, and measurements are made of the compressibility of the core at these pressures in order to provide information useful in analyzing oil reservoirs. The elevated pressure is applied to chamber 10 by means of hydraulic fluid which is supplied from a reservoir 11. A conduit 12, which has a pump 13 and a valve 14 therein, communicates between reservoir 11 and chamber 10 to supply hydraulic fluid at an elevated pressure which is established by operation of hydraulic pump 13. A return conduit 15, which has a valve 16 therein, is connected between conduit 12 and reservoir 11 to permit venting of the hydraulic fluid and thereby lower the pressure within chamber 10. An adjustable volume hydraulic fluid reservoir 17 is connected to conduit 12 by means of a conduit 18. A pressure gage 19 is connected to conduit 12 to measure the pressure in chamber 10.

The internal volume of reservoir 17 is adjusted by means of a motor 20 which is connected to the chamber through a gear box 21. Rotation of motor 20 is controlled by a motor control unit 22 which is connected to pressure gage 19. In the illustrated embodiment of this invention, reservoir 17 comprises a cylinder 23 which has a central chamber 24 in communication with conduit 18. A piston 25 is positioned to move longitudinally in chamber 24 to adjust the volume thereof. A seal 26 surrounds piston 25 to prevent leakage of hydraulic fluid from chamber 24. Piston 25 is connected to a nut 27 which is provided with internal threads that are engaged by a threaded shaft 28. Shaft 28 is connected to gear box 21 so as to be rotated by motor 20. Nut 27 and shaft 28 are surrounded by a sleeve 30 which is secured to cylinder 23. A thrust bearing assembly 31 is disposed between the end of sleeve 30 and a plate 32 which is carried by shaft 28. Sleeve 30 is provided with one or more longitudinal slots 33 through which one or more pins 34, which are carried by nut 27, can move. This prevents nut 27 from rotating so that the nut and piston 25 are moved longitudinally through sleeve 30 in response to shaft 28 being rotated. The resulting movement of piston 25 in a forward direction decreases the volume of chamber 24, whereas movement of piston 25 in the reverse direction increases the volume of chamber 24. As will be described hereinafter in greater detail, this movement of piston 25 takes place in response to changes in pressure within the hydraulic system as detected by pressure gage 19 so as to maintain a constant pressure in chamber 10.

Figure 2:
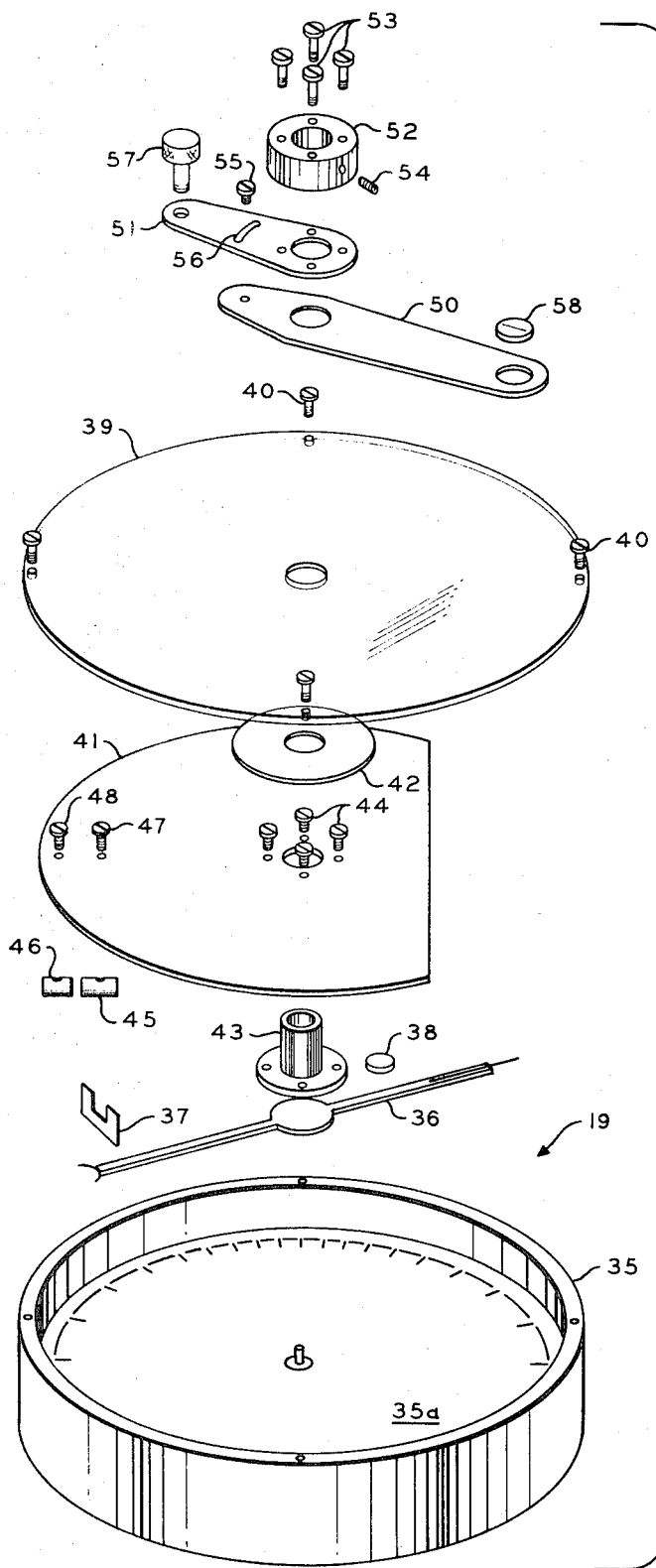
FIG. 2 is an exploded view illustrating the pressure gage and a portion of the motor control apparatus of FIG. 1.

Pressure gage 19 and a portion of the control equipment associated therewith are illustrated in FIG. 2. The pressure gage is provided with a case 35 which extends upwardly above the face 35a of the gage. The gage is provided with a conventional pointer 36 which provides a visual indication of the magnitude of the pressure being sensed. In accordance with this invention, an opaque shutter 37, which has a slit in the central region thereof, is mounted on one end of pointer 36, and a counterweight 38 is mounted on the other end. A transparent cover plate 39 is mounted on the top of case 35 by a plurality of screws 40. A mounting plate 41 is positioned immediately below cover plate 39, and is separated therefrom by a washer 42. A hub 43 protrudes through central openings in elements 41, 42 and 39, and is secured to disk 41 by a plurality of screws 44.

A light source 45 and a dual photocell assembly 46 are secured to the bottom of disk 41 by respective screws 47 and 48. Elements 45 and 46 are mounted in spaced relationship with one another so that shutter 37 is free to move therebetween as pointer 36 rotates. Two separate plates 50 and 51 are positioned above cover plate 39 and held in engagement therewith by a collar 52 which is secured to upper plate 51 by a plurality of screws 53. Hub 43 extends through plates 50 and 51 into collar 52 and is secured to the collar by a set screw 54. Plate 51 can be secured to plate 50 by means of a screw 55 which extends through a slot 56 in plate 51. An adjusting knob 57 extends through plate 51 into engagement with cover plate 39 so that plate 51 can be locked in a given position relative to cover plate 39. A reticle 58 is mounted in plate 50 to provide a visual indication of the location of the end of pointer 36.

In the operation of the control system of this invention, plates 50 and 51 initially are moved relative to cover plate 39 so that reticle 58 is aligned with a location on the face 35a of the gage which is representative of the desired pressure to be maintained in chamber 10. Valve 14 is opened, valve 16 is closed, and pump 13 is actuated to increase the pressure in chamber 10. When the desired pressure is reached, valves 14 and 16 are closed and pump 13 is deactuated. At this time, pointer 36 indicates the desired pressure and shutter 37 is aligned so as to block the transmission of light from source 45 to the spaced apart photocells of the dual photocell assembly 46. If the actual measured pressure should then deviate from the desired set point value, shutter 37 will be displaced so that light impinges on one of the individual photocells.

Figure 3:
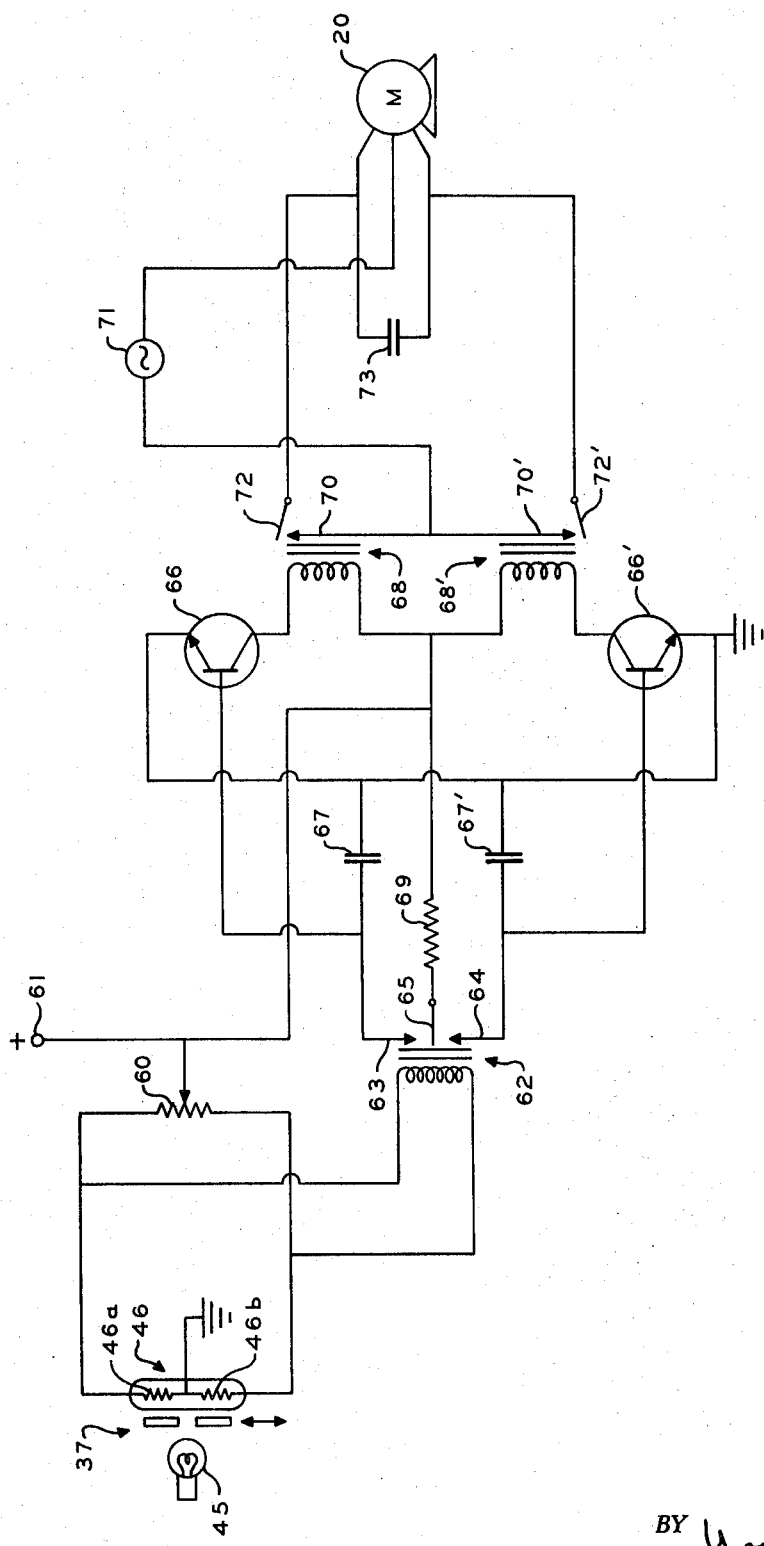
FIG. 3 is a schematic circuit drawing of the motor control unit.

The motor control circuit 22 is illustrated in FIG. 3. The dual photocell assembly 46 comprises two separate elements 46a and 46b, the electrical resistances of which are functions of light impinging thereon from source 45. When shutter 37 is centrally aligned relative to elements 46a and 46b, radiation does not impinge on either of the elements. The end terminals of a potentiometer 60 are connected to first end terminals of respective elements 46a and 46b. The second terminals of these elements are connected to ground. The contactor of potentiometer 60 is connected to a terminal 61 which is maintained at a positive potential. The end terminals of potentiometer 60 are connected to the coil of a polarized relay 62 which is provided with stationary contacts 63 and 64 and a movable arm 65. The contactor of potentiometer 60 initially is adjusted so that the bridge circuit is in a state of balance when shutter 37 is centrally aligned. At this time, arm 65 is positioned between contacts 63 and 64. However, if shutter 37 is moved so that light impinges on one of the photocell assemblies, a resulting unbalance is established in the bridge circuit which results in arm 65 engaging one of the stationary contacts, depending on the direction of movement of shutter 37.

Contact 63 is connected to the base of a transistor 66, the emitter of which is connected to ground. A capacitor 67 is connected between contact 63 and the grounded emitter of transistor 66. The collector of transistor 66 is connected to the first terminal of the coil of a relay 68. The second terminal of the coil of relay 68 is connected to terminal 61. A resistor 69 is connected between arm 65 and terminal 61. A second transistor 66' and a second relay 68' are connected in a corresponding manner with respect to contact 64 of polarized relay 62.

When arm 65 engages terminal 63, transistor 66 conducts to energize relay 68. Similarly, transistor 66' conducts to energize relay 68' when arm 65 engages contact 64. The stationary contacts 70 and 70' of respective relays 68 and 68' are connected to the first terminal of a source of alternating current 71. The second terminal of source 71 is connected to the first terminal of reversible alternating current motor 20. The movable arms 72 and 72' of respective relays 68 and 68' are connected to the respective second and third terminals of motor 20. A capacitor 73 is connected across these second and third terminals. When relay 68 is energized, motor 20 is energized to rotate in a first direction. When relay 68' is energized, motor 20 is energized to rotate in the opposite direction. Rotation of motor 20 results in movement of piston 25 longitudinally through chamber 24 of FIG. 1 to increase or decrease the volume of the chamber and thus the volume of the hydraulic system connected to chamber 10.

The control elements illustrated in FIGS. 2 and 3 are connected so that the volume of chamber 24 is increased if the measured pressure tends to rise above the desired set point value. Conversely, the volume of chamber 24 is decreased if the measured pressure tends to fall below the desired set point value. The control system thus serves to compensate the hydraulic system automatically for changes in pressure which can result from changes in ambient temperature.

While this invention has been described in conjunction with a presently preferred embodiment, it obviously is not limited thereto.

What is claimed is:

1. A hydraulic system to maintain a preselected pressure in a first chamber comprising: a source of hydraulic fluid under pressure, conduit means connecting said source of hydraulic fluid to said first chamber, valve means in said conduit means to isolate said first chamber from said source of hydraulic fluid, a variable volume second chamber communicating with said conduit means between said valve means and said first chamber, pressure indicating means communicating with said first chamber to establish a signal representative of the pressure in said first chamber, and means responsive to said signal to adjust the volume of said second chamber as said signal changes so as to maintain a preselected pressure in said first chamber.

2. The system of claim 1 wherein said second chamber comprises a cylinder, a piston positioned within said cylinder so as to be free to move longitudinally therethrough, a reversible motor, means connecting said motor to said piston so that rotation of said motor in a first direction moves said piston longitudinally in a first direction through said cylinder and rotation of said motor in a second direction moves said piston longitudinally in a second direction through said cylinder, and means to actuate said motor in response to said signal.

3. The system of claim 2 wherein said means connecting said motor to said piston comprises a sleeve, a threaded nut positioned within said sleeve and constrained from movement longitudinally through said sleeve, said nut being connected at one end to said piston, and a rotatable shaft threaded to said nut at one end and being connected to said motor at the other end so that rotation of said shaft results in longitudinal movement of said nut through said sleeve.

4. The system of claim 1 wherein said pressure indicating means comprises a pressure gage having a rotatable pointer associated therewith, a light source, first and second photocells mounted adjacent one another in spaced relationship with said light source, a shutter carried by said pointer and adapted for movement between said light source and said photocells in response to rotation of said pointer, a motor, and circuit means including said photocells to establish first and second signals to rotate said motor in first and second directions in response to individual ones of photocells receiving more light than the other.

5. The system of claim 1 wherein said source of hydraulic fluid, said conduit means and said valve means comprise a hydraulic fluid reservoir, first conduit means extending between said reservoir and said first chamber, a pump in said first conduit means, a first valve in said first conduit means between said pump and said first chamber, second conduit means extending between said reservoir and said first conduit means between said first valve and said first chamber to permit return of fluid to said reservoir, a second valve in said second conduit means, and means connecting said second chamber to said first conduit between said first valve and said first chamber.

* * * * *